Oct. 27, 1925.  1,558,607
R. H. HAZELTINE
LIQUID FEED DEVICE
Filed April 7, 1921   2 Sheets-Sheet 1
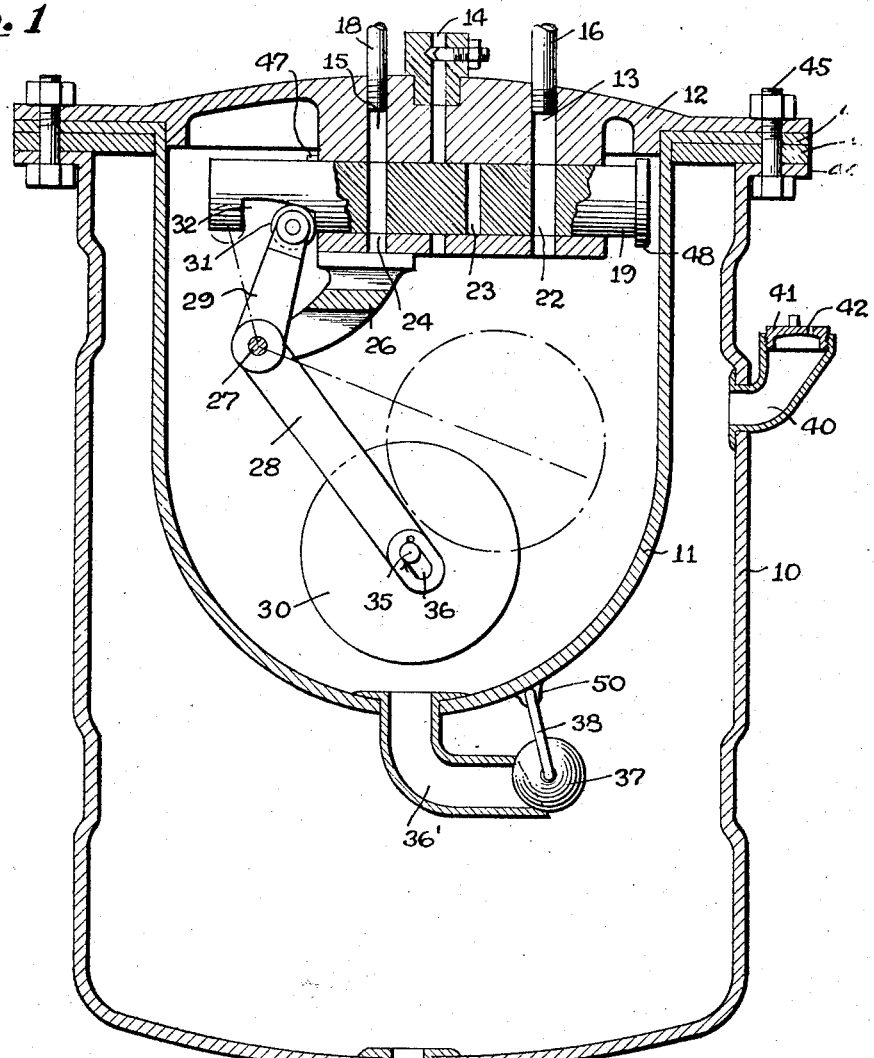
Fig. 1
Fig. 4
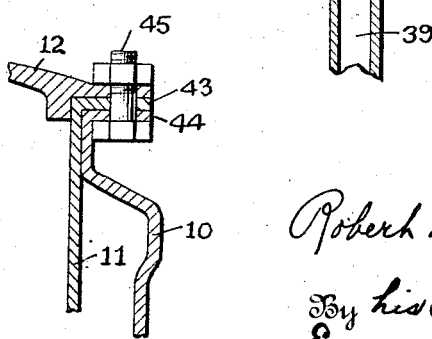
Robert H. Hazeltine Inventor
By his Attorneys Oct. 27, 1925.  
R. H. HAZELTINE  
LIQUID FEED DEVICE  
Filed April 7, 1921   2 Sheets-Sheet 2

1,558,607

Robert H. Hazeltine Inventor  
By his Attorneys  
Emery, Varney, Blair & Hogue

Patented Oct. 27, 1925.

1,558,607

UNITED STATES PATENT OFFICE.

ROBERT H. HAZELTINE, OF NEW YORK, N. Y.

LIQUID-FEED DEVICE.

Application filed April 7, 1921. Serial No. 459,390.

*To all whom it may concern:*

Be it known that I, ROBERT H. HAZELTINE, a citizen of the United States, and a resident of the city of New York, in the county and State of New York, have invented an Improvement in Liquid-Feed Devices, of which the following is a specification.

This invention relates to liquid feed devices and more particularly to feed devices for maintaining a constant level of a liquid in a reservoir which supplies a carburetor with a liquid combustible at a constant pressure.

An object of this invention is to provide a compact feed device that is readily adaptable for use with automobile engines and one that is so constructed that its operation is certain and frequent adjustments are not necessary; to also provide a simple and reliable mechanism for controlling the flow of liquid into the container.

The present invention aims to eliminate the difficulties encountered heretofore by providing a feed device that will operate independently of its position with respect to the upper tank and one that provides a lever mechanism which will make the operation more certain because the lever arms may be so proportioned as to give any desired force to the valve with a slight upward force to the float. This is done by providing in addition to the usual lower reservoir a liquid container which cooperates with the reservoir to give a more constant level. The addition of this liquid container makes only the opening of the valve in the liquid container dependent upon the level of the liquid in the feed reservoir, the closing of the valve being dependent upon the level of the liquid in the container which, at the time of closing, is independent of the level in the reservoir. After the closing of the valve, the two levels gradually adjust themselves at a rate dependent upon the air supplied through the air vent which is open to the atmosphere and adjustable in size. Thus it will be seen that, in addition to its compactness and simplicity, a more constant level is produced in the reservoir, making the device very adaptable for use with carburetors, which require a liquid of the constant pressure for the best results. This device may be used in any instance where it is desired to maintain a liquid at a constant level. Other objects will be in part obvious and in part pointed out hereinafter.

In the accompanying drawings, in which is shown an embodiment of this invention, by way of example, and in which similar reference characters refer to similar parts thereof, Figure 1 is a longitudinal cross-section of the device, showing the valve in the position assumed when the float is down;

Fig. 4 shows another way of fastening the liquid container and auxiliary reservoir together;

Figure 2:
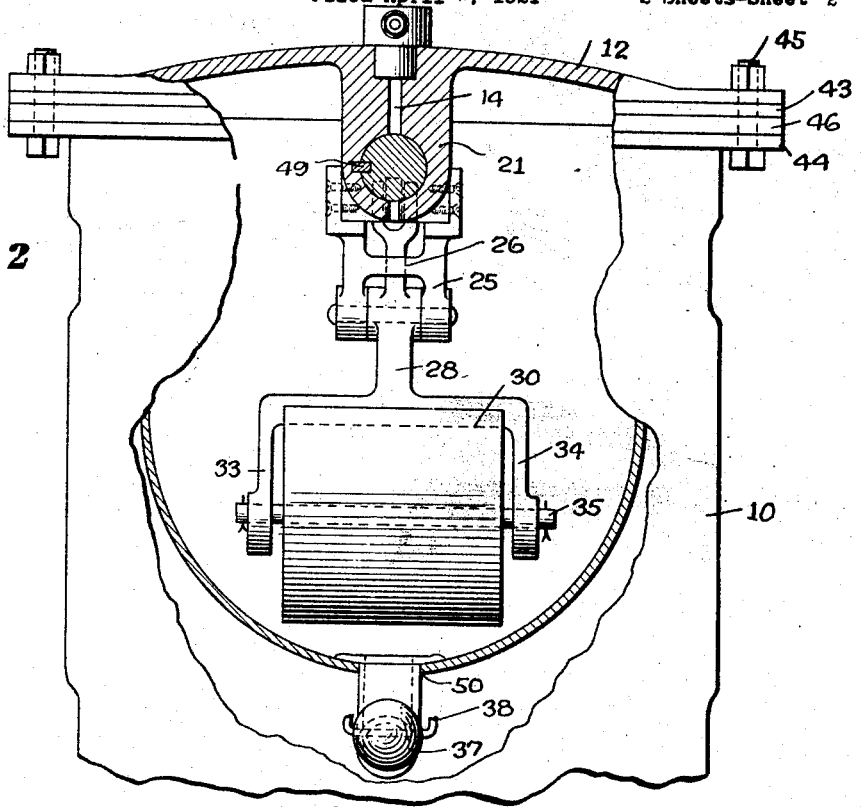
Fig. 2 is an end view, partly in section, of the device.

Referring more particularly to Fig. 1, the auxiliary reservoir is designated by the numeral 10 and the liquid container by the numeral 11, here shown within and concentric with the auxiliary reservoir. The cover 12 is common to both the auxiliary reservoir and the liquid container and is provided with the apertures 13 and 15 for the accommodation of the feed pipe 16 and suction pipe 18 and the air vent 14 open to the atmosphere. The pipe 16 leads from a fuel tank, which may be placed in any convenient position. The suction pipe 18 leads to a suction pump which may be run by the engine or any other suitable device such as the intake manifold, and operates, when the valve 19 is in the position shown in Fig. 1, to produce a vacuum in the liquid container and to pump the liquid through the pipe 16. The screw 20 inserted in the vent 14 is adapted to regulate the flow of air through the aperture. The cover 12 has an enlargement 21 with a longitudinal cylindrical cavity therein to receive the valve 19. This valve 19 controlling the opening and closing of the pipes leading to the container is provided with the apertures 22, 23 and 24 which are so designed as to cooperate with the apertures in the cover, above described, when the valve 19 is moved into predetermined positions which will be described more fully hereinafter.

Attached to the enlargement 21 is a pair of supports 25 connected by a reinforcing member 26, to which supports is attached a lever mechanism by the bolt 27. This lever mechanism consists of two arms 28 and 29 at an angle to each other which cooperate with the valve 19 and the float 30 to make the operation of the valve 19 dependent upon the float, as shown in Figs. 1 and 2. The arm 29 carries the roller 31 which cooperates with the shoulders of the slot 32 to operate the valve 19. The arm 28 has a pair of legs 33 and 34 integral at one end connected by a bolt 35 upon which is mounted the float 30, here shown as cylindrical. The liquid container 11 and the auxiliary reservoir 10 are connected by the pipe 36' which is provided with a check valve at its end. This valve may be formed in any suitable way as by having a ball 37 suspended by the arms 38 from a suitable point of oscillation 50 on the liquid container. This point is so located that the ball 37 normally rests against the opening of the pipe through the action of gravity. The auxiliary reservoir is connected by the pipe 39 to the carburetor or other device which it is to supply with fuel.

Figure 3:
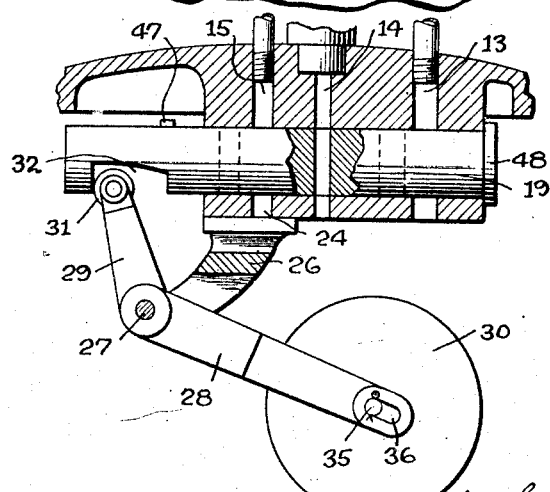
Fig. 3 is a detailed view in cross-section, showing the valve mechanism in the position assumed when the float is up.

When the float is in the position shown in Fig. 1, the valve 19 is in the position that opens the feed and suction pipes and closes the air vent. Now, since the valve 19 is closed, the partial vacuum caused by the suction pipe 18 makes the liquid flow through the pipe 16 into the liquid container until the float rises to its dotted position. At this time the valve will be moved into the position shown in Fig. 3, where the feed and suction pipes are closed and the air vent 14 is open. It will be apparent that when the valve is in this position the fuel in the feed pipe 16 is trapped and that the feed pipe is therefore filled with fuel at all times, which results in prompt response to the suction when the valve is again opened. The supply of air admitted through the vent 14 increases the pressure in the liquid container and thereby causes the liquid to flow through the pipe 36 into the auxiliary reservoir 10 at a rate depending upon the adjustment of the screw 20. The liquid continues to flow until its level is substantially the same as that in the auxiliary reservoir and decreases with the level of the auxiliary reservoir until the float drops to the position shown in Fig. 1, when the operation repeats itself. There are provided in the legs 33 and 34 oval apertures 36 into which the bolt 35 fits. These oval apertures, together with the slot 32, shown in the valve 19, permit a considerable movement of the float before the operation of the valve is commenced. This allows the liquid to flow freely until the extreme levels are reached, at which time the valve 19 is quickly operated. The valve 19 is limited in movement by the stop 47 in one direction and by the annular ring 48 in the other direction, and it is prevented from rotating by the key 49.

It should be noted that in the operation of the valve the regulation of the pipes 16 and 18 and the air vent 14 is sequential. When the float begins to rise from the position shown in Fig. 1 due to the liquid flowing through the pipe 16 because of the vacuum in the liquid container 11 produced by the suction pipe 18, the suction pipe is first closed while the feed pipe 16 is partly open. The vacuum entrapped at the closing of the suction pipe 18 continues to cause the liquid to flow through the feed pipe 16 until the float rises to the position where the valve 19 has completely closed the feed pipe 16, and opened the air vent 14. The closing of the suction pipe before the closing of the feed pipe prevents the suction pipe and air vent being open at the same time and also insures the complete movement of the valve since the liquid will continue to flow and the float continue to rise because of the entrapped vacuum. When the float operates to close the air vent 14 and open the suction and feed pipes, the relative positions of the apertures in the cover 12 and the valve 19 are such that the air vent is completely closed and the liquid feed pipe is partially open when the suction pipe begins to open. thus assuring perfect operation.

It should also be noted that the opening of the suction and feed pipes is dependent upon the level of the liquid in the auxiliary reservoir but that when the valve is once open the level in the auxiliary reservoir ceases to have an effect and the valve is closed at a predetermined upper level in the liquid container which is entirely independent of the level in the reservoir. Thus, it is feasible by changing the relative sizes of the liquid container and the auxiliary reservoir to maintain a level in the reservoir as constant as desired. It is also to be noted that by changing the lever mechanism, making one arm longer than the other, a greater certainty of operation is secured.

The auxiliary reservoir 10 is provided with a pipe 40 which is fitted with a stopper 41 in which is an aperture 42. This pipe 40 is used primarily for priming purposes when the liquid combustible being supplied to the liquid feed device has been completely exhausted, in which case, of course, the engine must stop and the suction in the pipe 18 ceases. When the supply of fuel is replenished, it may be found easier to remove the stopper 41 and pour some fuel into the auxiliary reservoir 10 than to turn the engine sufficiently to create a suction and to fill the auxiliary reservoir thereby. The aperture 42 in the stopper is to keep the pressure in the auxiliary reservoir always equal to that of the atmosphere so that the liquid will flow freely through the pipe 39 to the carburetor at all times.

The liquid container 12 as shown is provided with a flange 43 which is interposed between the cover 12 and the flange 44 of the auxiliary reservoir, and the three clamped together securely by the bolt 45, as shown in Fig. 4. It is usually desirable to have the liquid container smaller in size than the auxiliary reservoir, in which cases the flange 43 will be quite wide and it is found convenient to provide a reinforcing member 46 to reinforce this flange as fully shown in Fig. 1.

It will be noted that the device above described is simple in construction and easily manufactured from readily obtainable material, that it combines inexpensiveness with effective operation and is able to provide the commercial carburetor with a liquid fuel at a much more constant pressure than devices heretofore used. Its operation is independent of its position relative to the fuel tank or to the carburetor. Its lever mechanism is capable of multiplying the forces exerted by the float thereby assuring effective opening and closing of the valve and is not subject to jamming and sticking as in the case of many devices now in use.

As various embodiments may be made in the invention above set forth and as many changes might be made in the structure hereinbefore described, it is to be understood that all matter herein set forth is to be interpreted as illustrated and not in a limiting sense.

I claim:

1. In a device of the class described, in combination, a liquid container, an air vent therein, suction and fuel feed pipes leading into said container, a valve controlling the opening and closing of said pipe lines and said air vent, said air vent being adapted to be opened after the closure of one of said pipe lines and means operatively connected to said valve to control the movements thereof.

2. In a device of the class described, in combination, a liquid container, an air vent therein, suction and fuel feed pipes leading into said container, a valve adapted to open and close the suction and fuel feed pipes substantially simultaneously and to open the air vent after the closing of the said suction pipe whereby entrapped vacuum causes the fuel to feed into said container during the interval between the closing of the suction pipe and the complete opening of the air vent, a float in said container, and means cooperating with said float and said valve to permit the float to regulate the movements of said valve.

3. In a device of the class described, in combination, a liquid container, an auxiliary reservoir, a check valve connecting said liquid container and said auxiliary reservoir, suction and feed pipes leading into said liquid container, an air vent in said container, a valve for controlling the opening and closing of said pipes and said air vent, and a float in operative relation to said valve to make the operation of said valve dependent upon the movement of said float, the air vent being opened subsequent to the closing of the suction and feed pipes.

4. In a device of the class described, in combination, a liquid container, an air vent in said container, an auxiliary reservoir, a check valve connecting said liquid container and said auxiliary reservoir, suction and feed pipes leading into said liquid container, a valve for controlling the opening and closing of said pipes and said air vent, said vent being opened subsequent to the closing of the suction and feed pipes, a float in said liquid container, and a lever mechanism connecting said float and said valve to make the operation of said valve dependent upon the movement of said float.

5. In a device of the class described, in combination, a liquid container, an air vent in said liquid container, an auxiliary reservoir, a check valve connecting said liquid container and said auxiliary reservoir, suction and feed pipes leading to said liquid container, a valve for closing the suction and feed pipes and opening the air vent subsequent to the closing of said suction pipe but simultaneous with the closing of the fuel pipe, a float in said liquid container, and a lever mechanism connecting said float and said valve to make the operation of said valve dependent upon the movement of said float.

6. In a device of the class described, in combination, an auxiliary reservoir, a liquid container within said reservoir, a check valve permitting the liquid to flow from said container to said reservoir, an air vent in said container, suction and feed pipes leading to said container, a valve for controlling the opening and closing of said pipes, and a float operatively connected to said valve to actuate said valve for the opening of the suction and feed pipes and closing of said air vent when the liquid reaches a predetermined level in said container admitting more liquid through said feed pipe, said float actuating the valve for the closing of the suction and feed pipes and the opening of the air vent when the liquid reaches another predetermined level and subsequent to the closing of the suction pipe.

7. In a device of the class described, in combination, an auxiliary reservoir, an interior liquid container substantially concentric therewith and integral with the top thereof, a check valve permitting a liquid to flow from said container to said reservoir, suction and feed pipes leading to said container, an air vent in said liquid container, a valve for the opening and closing of said pipes and said air vent, and a float operatively connected to said valve to actuate said valve for the opening of the suction and feed pipes subsequent to the closing of the air vent when the liquid reaches a predetermined level in said container admitting more liquid through said feed pipe, said float actuating the valve for the closing of the suction feed pipes and the substantially subsequent opening of the air vent when the liquid reaches another predetermined level in said container.

In testimony whereof, I have signed my name to this specification this 29th day of March, 1921.

ROBERT H. HAZELTINE.